United States Patent [19]
Scragg

[11] Patent Number: 6,000,214
[45] Date of Patent: Dec. 14, 1999

[54] DETONATION CYCLE GAS TURBINE ENGINE SYSTEM HAVING INTERMITTENT FUEL AND AIR DELIVERY

[76] Inventor: Robert L. Scragg, P.O. Box 9083, Daytona Beach, Fla. 32120-9483

[21] Appl. No.: 08/991,483

[22] Filed: Dec. 16, 1997

Related U.S. Application Data

[63] Continuation-in-part of application No. 08/679,427, Jul. 8, 1996, abandoned.

[51] Int. Cl.[6] .................................................. F02C 5/02
[52] U.S. Cl. ...................... 60/39.38; 60/39.76; 60/39.827
[58] Field of Search ............................. 60/39.06, 39.821, 60/39.827, 39.76, 39.38

[56] References Cited

U.S. PATENT DOCUMENTS

| | | | |
|---|---|---|---|
| 1,174,439 | 3/1916 | Pelley | 60/39.38 |
| 2,608,058 | 8/1952 | Geeraert | 60/39.38 |
| 4,254,617 | 3/1981 | Papsdorf | 60/39.76 |
| 4,374,288 | 2/1983 | Scragg | 568/910 |
| 4,589,398 | 5/1986 | Pate et al. | 123/596 |
| 4,807,440 | 2/1989 | Salem | 60/39.76 |

OTHER PUBLICATIONS

Pratt, G. L., "Experimental Methods", *Gas Kinetics*, Chapter Two, John Wiley & Sons Ltd., pp. 50–59.

*Primary Examiner*—Ted Kim
*Attorney, Agent, or Firm*—Shoemaker and Mattare, Ltd.

[57] ABSTRACT

A detonation cycle gas turbine engine includes a turbine rotor contained within a housing. Exhaust ports of respective valveless combustion chambers on opposite sides of the rotor direct combustion gases toward the turbine. The chambers are connected by a valveless manifold fed with fuel and oxidizer. When combustible gases are detonated by an igniter in one of the combustion chambers, the back pressure from the detonation shuts off the fuel and oxidizer flow to that chamber and redirects the fuel and oxidizer to the opposite chamber, where detonation occurs, the process repeats cyclically. Power is taken off the rotor shaft mechanically or electrically.

8 Claims, 7 Drawing Sheets

6,000,214

DETONATION CYCLE GAS TURBINE ENGINE SYSTEM HAVING INTERMITTENT FUEL AND AIR DELIVERY

This application is a continuation-in-part of application Ser. No. 08/679,427, filed Jul. 8, 1996, now abandoned.

BACKGROUND OF THE INVENTION

The invention described hereinafter is directed to the field of detonation cycle gas turbines and to the methods and apparatus constituting said turbine system.

In the field of gas turbines and piston engines, there are different methods and apparatus which are utilized to convert the kinetic and thermal energy of gas reactions in combustion chambers to extract useful work. The design of the combustion chambers, the expanders, the type of fuel, the fuel-air ratio, the pressure of the fuel-air mixture prior to ignition, and the type of ignition, all determine the rate of oxidation. The rate of oxidation determines and defines whether the fuel and the oxidizer produce a constant propagating flame, a deflagrating explosion and accelerated flame front, or a detonation and high velocity shock waves. In either case, the oxidizer must be activated or raised to a higher energy level by some means to initiate the oxidation reaction. The manner of the activation will vary the rate of the reaction and produce the variation in result from a flame, to a deflagrating explosion, to a detonation.

The methods and apparatus utilized in an Otto cycle spark ignition gasoline piston engines are variable volume—constant pressure—combustion chambers, that induce and compress air and fuel mixtures to 6 or more atmospheres reducing the atmospheric ignition temperature from 1,000 degree F to 500 degree F, then ignite the mixture with an electric spark producing low power photolytic and radiolytic radiation, typically 80 millijoules, that activates and disassociates oxygen and hydrocarbon molecules in the immediate proximity of the electric spark, resulting in a deflagrating explosion with an accelerated flame front. The thermal energy of the flame front propagates throughout the mixture, thermally activating and chemically combining remaining reactants in a "chain burn" with typical mean pressures of 90 pounds per square inch gauge over a time period of 8 to 16 milliseconds while expanding the pistons down the chambers. The methods and apparatus utilized in Otto cycle engines are not useable with Diesel cycle engines, Brayton cycle or Detonation cycle turbines. Otto cycle engines in the 200 horsepower range typically utilize 9 pounds of air and 0.6 pounds of fuel per horsepower hour while producing 9.6 pounds of exhaust gas per horsepower hour.

The methods and apparatus utilized in Diesel cycle compression ignition diesel fuel piston engines are variable volume—constant pressure—combustion chambers, that induce and compress air to 15 or more atmospheres, and injects compressed fuel in the top of the chamber at the top of the compression stroke. Molecules of oxygen and hydrocarbons disassociate when compressed against the hot head of the combustion chambers resulting in free radicals that chemically combine exothermically in a deflagrating explosion with an accelerated flame front. The thermal energy of the flame front probagates throughout the mixture, thermally activating and chemically combining remaining reactants in a "chain burn" with mean pressures typically in excess of 90 pounds per square inch gauge over a time period of 12 to 24 milliseconds while expanding the pistons down the chambers. The methods and apparatus utilized in in Diesel cycle engines, are not useable with Otto cycle engines, Brayton cycle or Detonation cycle turbines. Diesel cycle piston engines in the 200 horsepower range typically utilize 11 pounds of air and 0.55 pounds of fuel per horsepower hour while producing 11.55 pounds of exhaust gas per horsepower hour.

The methods and apparatus utilized in Brayton cycle compression ignition turbine fuel gas turbines are constant volume—constant flow—constant pressure combustion chambers; a compressor that compresses air from 3 to 6 atmospheres; a pump that compresses fuel up to 40 atmospheres; and an axial flow or radial inflow turbine expander. Compressed air is fed into the combustion chamber and combined with the hot compressed fuel. An Infrared glow plug is often utilized to increase the thermal activation of the oxygen and hydrocarbon molecules, at the surface of the plug, to bring the mixture to the ignition temperature. Ignition occurs as a very low pressure deflagrating explosion with a constant pressure flame front. The thermal energy produced by the flame front radiates thermal waves with sufficient energy to continuously ignite the constant flowing high pressure fuel-air mixture and expand the surplus air in the burn plennum to drive the turbine while maintaining a constant pressure. Maintaining constant pressure is critical. Variation of pressures in the combustion chambers will cause flame out. Over pressure in the plennum will stall the compressor. The methods and apparatus utilized in a Brayton cycle turbine are not useable with Otto cycle or Diesel cycle engines, nor Detonation cycle turbines. Brayton cycle gas turbines In the 200 horsepower range, operated in an open cycle configuration at sea level, typically utilize 40 pounds of air and 1.2 pounds of fuel per horsepower hour, while producing 41.2 pounds of exhaust gas per horsepower hour.

SUMMARY OF THE INVENTION

The methods and apparatus utilized in this invention, a Detonation Cycle Gas Turbine, are two constant volume—cyclic flow—combustion chambers connected by a common manifold; a blower that produces and supplies low pressure air to the manifold; a fuel pump that supplies low pressure gaseous fuel to the combustion chambers; and a constant visible arc ignition; and a positive displacement turbine. The blower supplies air to the combustion chambers via the manifold. Fuel is Injected into venturis in the manifold next to the combustion chambers. The high power, 300 joule, arc ignitions, producing photolytic and radiolytic particles and waves disassociates oxygen and hydrocarbon molecules throughout the combustion chambers, producing complete detonation and high velocity shock waves that kinetically compress the remaining inert gases in the combustion chambers. Detonation pressures exceed 80 atmospheres and produce mean chamber pressures of 20 atmospheres to drive the turbine. The methods and apparatus utilized in Detonation cycle gas turbine are not useable with Brayton cycle gas turbines, nor Otto cycle and Diesel cycle engines. The Detonation cycle gas turbine, operated in an open cycle configuration at sea level in the 200 horsepower range, typically utilizes 5.2 pounds of air and 0.3 pounds of fuel per horsepower hour while producing 5.5 pounds of exhaust gas per horsepower hour.

This invention utilizes a modified Pelton Water Wheel, as the turbine wheel, with blades that are positively displaced through a blade race by kinetic impact and expansion of gases exiting from combustion chambers via nozzles, rather than pistons, axial flow, or radial inflow expanders.

This invention utilizes a turbine housing with a turbine wheel chamber that directs expanding gases through a positive displacement blade race tangentially followed by an expanded blade race to an exhaust port.

This invention utilizes a blower, rather than a compressor, to supply less air per horsepower hour than required by existing gas turbines or piston engines, thereby producing less exhaust gas per horsepower hour.

This invention utilizes a blower, rather than a compressor, to supply low pressure air, less than 2 atmospheres, via a single manifold to two combustion chambers simultaneously.

This invention utilizes a blower, rather than a compressor, to supply less air at lower pressure; thereby consuming less work to complete a detonation cycle, resulting in higher thermomechanical efficiencies than gas turbines or piston engines.

This invention utilizes manifolds, combustion chambers and ignition systems that have the capability of cyclically detonating fuel-air mixtures without utilizing valves.

This invention utilizes fuel pumps and vaporizers to gasify wet fuels prior to mixing with combustion air to produce more complete combustion of fuel-air mixtures in the detonation process.

This invention utilizes venturis in the manifolds to uniformly mix gaseous fuels with combustion air prior to injection in the combustion chambers to produce complete combustion of fuel-air mixtures in the detonation process.

This invention utilizes a plasma arc ignition, a visibly constant illuminating plasma flame between two electrodes, to detonate fuel air mixtures and does not require critical Ignition timing.

This invention utilizes low pressure air and fuel mixtures that are detonated instanteously, in less than one millisecond, producing high velocity shock waves that kinetically compress inert gases resulting in higher working pressures than the pressures produced in constant pressure heating utilized in Brayton cycle turbines, Otto and Diesel cycle piston engines.

This invention utilizes a detonation cycle that utilizes less working fluid and produces significantly less exhaust gas per horsepower hour than Brayton cycle turbines, Otto or Diesel cycle piston engines.

At least one turbine is provided in driving relation to a shaft supported in bearings mounted in opposite end walls of a housing for the turbine. The side walls of the housing are ported to accommodate combustion chambers, expansion chambers and exhaust ports. The combustion chambers are secured to the housing over each respective port, with the firewall end of the chamber facing the periphery of the turbine. Expansion chambers and exhaust ports are positioned downstream from the combustion chambers. Nozzles are ported in the firewalls of the combustion chambers, extend and are directed to the periphery of the turbine. High-voltage electrodes are positioned in the wall of each combustion chamber and are continuously fired by high frequency high-voltage transformer and capacitor networks. A low static pressure rotary blower is driven by the turbine shaft to supply air as an oxidizer via a common manifold feeding two combustion chambers. Fuel gas, injected into venturi turbes on the downstream end of the manifold, mixes with the oxidizer and is fed into the combustion chambers at low static pressure. Both radiolytic and photolytic radiation produced by the high voltage-high frequency plasma arcs in the combustion chambers atomizes and ionizes oxygen molecules initiating instantaneous oxidization and detonation producing high-pressure shock waves that kinetically compress Inert gas molecules in the chambers. The resulting high-pressure compressed gases are directed from the combustion chambers to the periphery of the turbine via nozzles. The high pressure compressed gases, when exhausted from the nozzles, kinetically impact positive displacement blades on the periphery of the turbine, imparting momentum to the turbine. As the turbine rotates, the compressed gases expand across the periphery of the turbine blades into an expansion chamber further accelerating the turbine. The compressed gases continue to expand via the respective exhaust ports. The torque produced by the acceleration of the turbine and shaft is converted to work or power by conventional mechanical or electrical means. Acceleration, torque, and resulting power output can be increased or decreased by the volumes of combustion chambers, the number of combustion chambers and turbines, the radius of the turbines, and the amount of air and fuel utilized.

The principles of the invention will be further discussed with reference to the drawings wherein preferred embodiments are shown. The specifics illustrated in the drawings are intended to exemplify, rather than limit, aspects of the Invention.

DETAILED DESCRIPTION OF THE PREFERRED EMBODIMENTS

Figure 1:
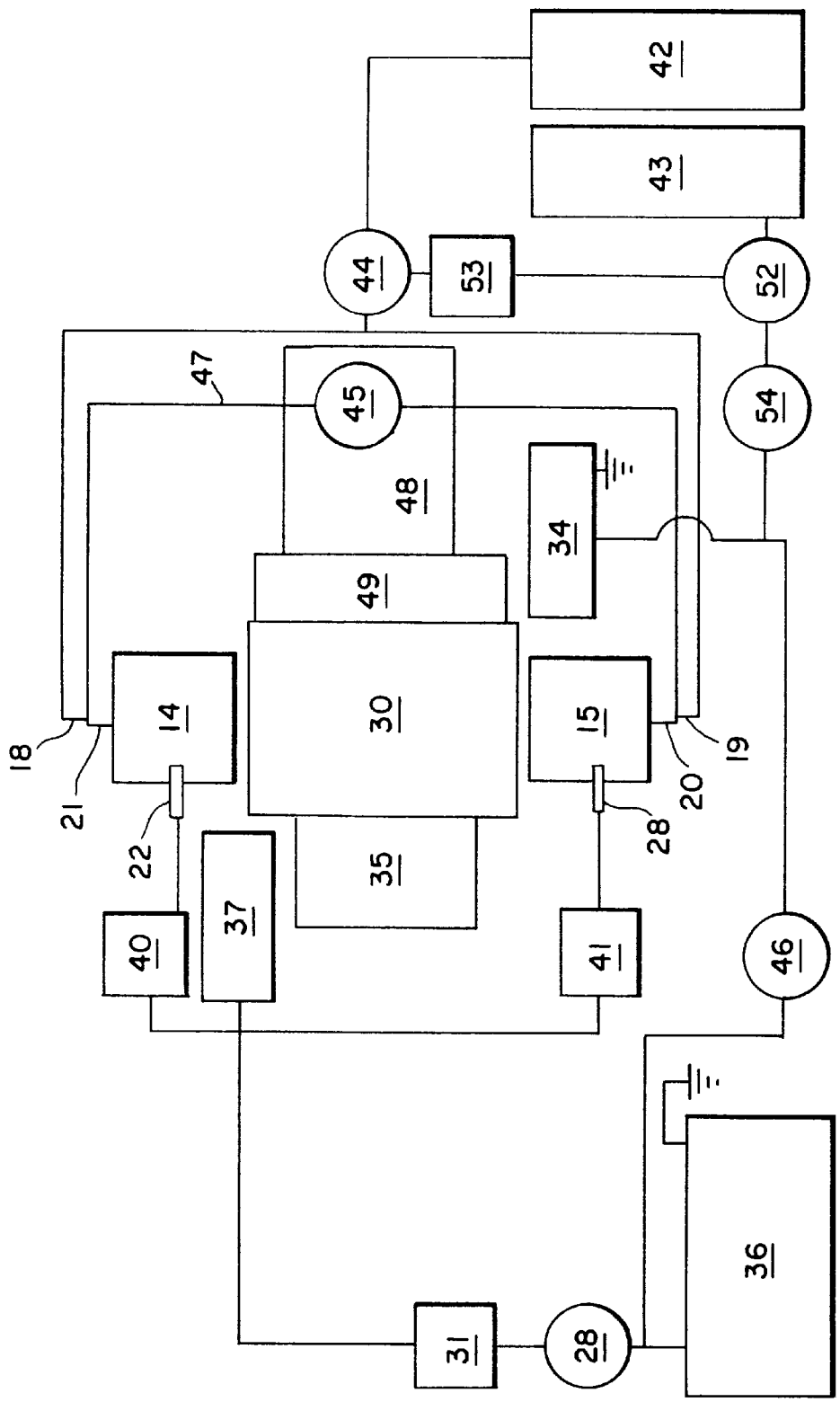
FIG. 1 is a block diagram of the turbine engine system.
Figure 2:
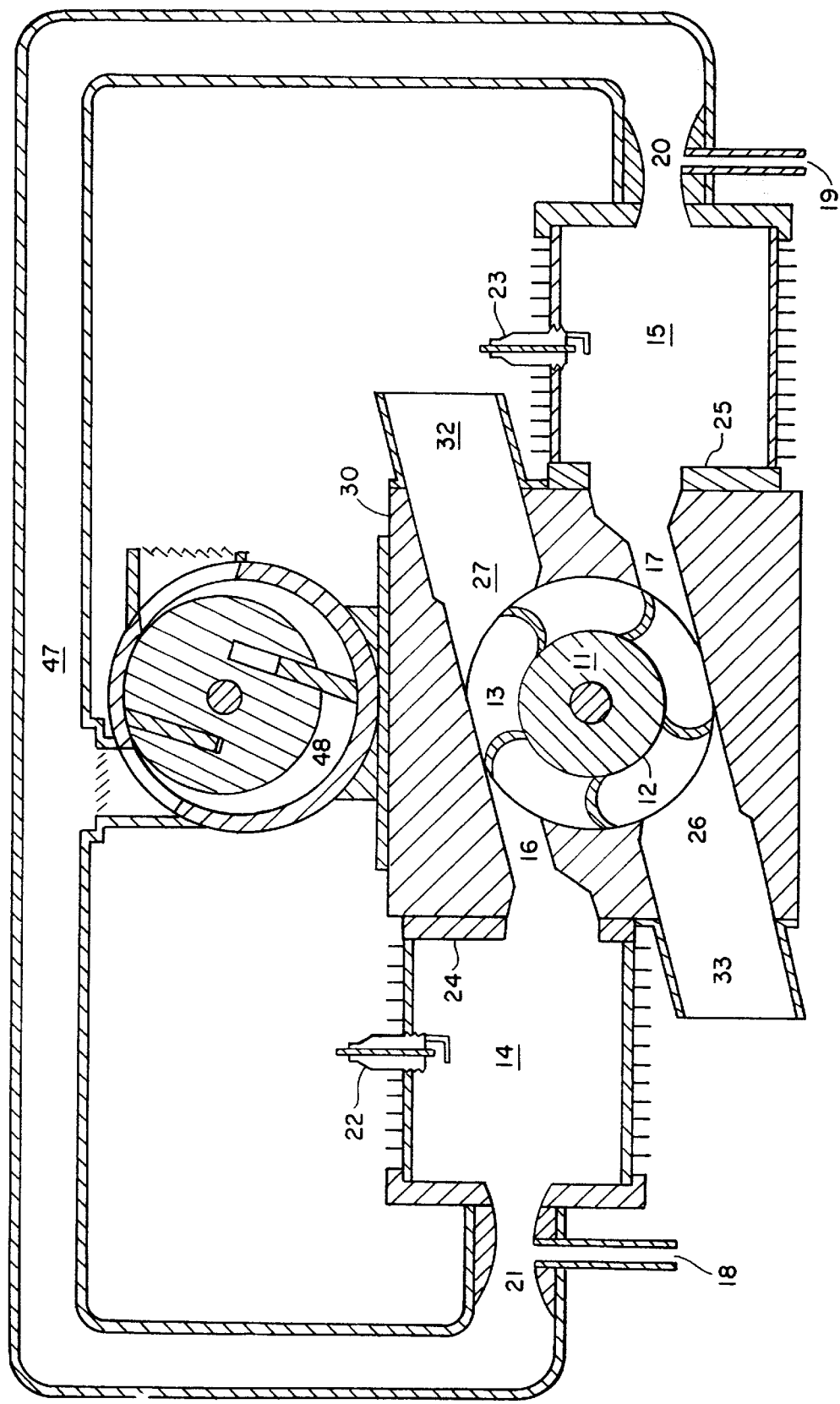
FIG. 2 is a cross-sectional view of the turbine engine, rotary blower, manifolds and combustion chambers of the system shown in FIG. 1.

In the illustrated preferred embodiment, the Detonation Cycle Gas Turbine is illustrated in FIGS. 1 and 2. Referring to FIGS. 1 and 2, the turbine system includes a straight drive shaft 12 on which are mounted for rotation with the drive shaft, a positive displacement turbine wheel 11, a conventional rotary blower 48, a conventional flywheel 49 and a conventional power take-off unit 35 operatively connected to a conventional alternator 37.

The turbine engine further includes a block 30 (FIG. 1) having end walls in which the drive shaft 12 is journalled for rotation. The block 30 has an internal cavity in which the turbine 11 is housed, this cavity includes two axially opposite end walls and an outer peripheral wall. The block 30 is suitably air, water or chemical cooled.

The turbine wheel 11 (FIG. 2) has a plurality of blades mounted on the radially outer periphery thereof at a plurality of equiangularly spaced sites. The individual blades extend axially from end wall to end wall of the internal cavity, and from the outer peripheral wall of the turbine wheel to the outer peripheral wall of the internal cavity. Suitable slide bearing surface are provided between the turbine blades and cavity walls. Accordingly, a succession of chambers is defined in a series about the turbine wheel 11 between angularly successive turbine blades.

The turbine engine has two combustion chambers, chambers 14 and 15 having respective firewalls 24, 25, provided at the inner end walls thereof. Fuel-oxidizer manifold ports are provided through the outer end walls thereof. A common inlet manifold 47 for low-pressure oxidizer gas, is intersected at inlet venturi throats 20, 21 by fuel inlet orifices 18, 19.

In accordance with principles of the invention, the combustion chambers are intersected between the inlet and firewall thereof by electrodes 22, 23, the inner ends of which are disposed within the combustion chambers, for providing a visible plasma arc therein during operation of the turbine engine. Through each firewall, directional nozzles 16, 17 communicate through the radially outer peripheral wall of the internal cavity of the block 30.

Generally, one-eighth of the way around the internal cavity of the block 30 from where nozzles 16, 17 intersects the outer peripheral wall of the internal cavity, the internal cavity is provided with expansion chambers 26, 27 leading outward to exhaust ports 32, 33.

The turbine, block, combustion chambers, inlets and outlets may be made of materials and using constructional techniques that are utterly conventional in the manufacture of piston and turbine engines.

The fuel supply (FIG. 1) for the turbine engine includes two fuel tanks. Fuel tank 42 is for gaseous fuels and fuel tank 43 for wet fuels. Both are connected by a fuel line to both orifices 18,19, via a throttle regulator valve 44. Fuel tank 43 has a motor 54 that drives a wet fuel pump 52 and sprays fuel into a fuel vaporizer 53 that converts the wet fuel to gas which is fed to throttle regulator valve 44.

The oxidizer supply for the turbine engine includes a manifold 47 connecting both venturi inlets 20, 21 with the output side of the rotary blower 48. At an upstream end of the manifold 47, a check valve 45 is provided for preventing compressed oxidizer backflow towards the blower.

The electrical system for the turbine engine system includes a battery 36, a starter motor 34, a voltage rectifer 31, a voltage regulator 28, an alternator 37, a power switch 46, and two high voltage ignition transformers 40,41. In operation, the power switch 46 is turned on to actuate the system, and engages the starter motor 34 with the battery 36. The starter motor 34 engages the flywheel 49 thus turning the drive shaft 12, power take off 35, alternator 37, and the air blower 48. The air blower 48, driven by the drive shaft 12, produces low pressure air that is fed via the check valve 45 and manifold 47 to the inlet venturis 20,21. Fuel gas from fuel tank 42 or 43 is throttled via regulator valve 44 into the low pressure air stream via orifices 18,19 and into the chambers 14,15, via the venturis 20,21. The alternator 37 provides electrical power to high voltage transformers 40,41, that supply high voltage to arc electrodes 22,23.

According to the preferred design, the low pressure air manifold piping to the combustion chamber 14 is shorter in length than that to the combustion chamber 15. Accordingly, the fuel-air detonation occurs in combustion chamber 14, closely followed by one in combustion chamber 15 and so, in alternation. The cyclic detonations in combustion chambers 14 and 15 produce high pressure gases that expand, and via the respective nozzles 16, 17, kinetically impact and expand across respective ones of the blades of the turbine wheel 11, thereby turning the drive shaft 12 to provide rotary output to the power take-off unit 35. The power take-off unit 35 turns the alternator 37 that generates DC power via the voltage rectifier 31 and voltage regulator 28 to maintain a full charge on the battery 36, and provides continuous AC power to the high voltage transformers 44,41. The air blower 48 rotation is sustained by the drive shaft 12.

By preference, the rotary blower 48, produces static air pressure in the range of 3.5 to 15 pounds per square inch gauge, at the output side of the blower.

The gaseous fuel contained in the fuel tank 42 preferably comprises propane. However, other gaseous fuels such as hydrogen, acetylene, butane, compressed natural gas can be utilized. The liquid (wet) fuels contained in fuel tank 43 preferably comprises gasoline, however, other wet fuels such as diesel fuel, methanol, ethanol, or liquid natural gas can be utilized. The fuel delivery pressure (obtained by pressurizing the fuel tank and/or by using a wet fuel pump 52 and fuel vaporizer 53 for boosting fuel pressure in the fuel delivery line to the orifices 18,19) is preferably in the range of 7.5 to 20 pounds per square inch gauge, and at least slightly higher than the aforementioned air oxidizer pressure.

The high voltage transformers 40,41 preferably includes a 60 to 400 cycle, 120 volts AC, primary winding with a 15,000 volt AC center-tapped secondary winding with capacitors in parallel across each winding, creating an electrical tank circuit that oscillates at high frequency and supplies electrical power to the arc electrodes 22 and 23. Each 7,500 volt secondary transformer winding and capacitor network oscillates at 100,000 cycles per second at 40 milliamperes, delivering 300 joule to each of the arc electrodes 22,23.

Each arc electrode 22,23 produces electromagnetic radiation, both photolytic and radiolytic, from the high frequency plasma arc gaps. The density and power of the radiated photons and charged radiolytic particles produced by the arcs at electrodes 22 and 23 scatter throughout the chamber and the low pressure air fuel mixture, kinetically impact and split oxygen molecules. The oxygen atoms, oxidize the fuel molecules instantaneously throughout the chamber producing a detonation and high velocity shock waves through the chamber.

The pressure of the shock waves resulting from the detonations compress remaining inert gases in the chambers into high pressure masses. At the time of each detonation, the overpressure momentarily shuts off the air and fuel flow at respective orifice 18, 19 and venturi turbe 21,22. The compressed gases that exhaust via the respective directional nozzle 16,17 disposed in the firewall section 24,25 of respective combustion chamber 14,15 kinetically impact the elliptical blades in the peripheral cavities 13 on the outer radial surface of the turbine wheel 11. The turbine wheel 11 rotates on and turns the drive shaft 12 in the direction of the impact of the pressurized gas masses. The expanding gases expand over the tops of the turbine blades which are positioned on the radial surface of the turbine at intervals that permit impulse and expansion of the compressed gases into the expansion chamber 27, further accelerating the turbine. During the cut off period of orifice 18 and venturi 21, the blower air or other oxidizer is redirected via the manifold 47 to combustion chamber 15 via venturi 20 and fuel orifice 19 where the detonation process is repeated.

The blower 48 volume, manifold 47 volume, combustion chambers 14, 15 volumes and nozzles 16, 17 volumes are preferably balanced to produce an average displacement that results in fifteen detonations per second per chamber.

The mean inlet temperature at the outlets of nozzles 16 and 17 are the average temperatures of the compressed gases impacting the turbine 11 and elliptical bladed cavities 13 and are controlled by the number of detonations per second per chamber. The temperature drop across the turbine 11 is equal to the inlet temperature at the outlet of nozzle 16 less the outlet temperature at exhaust port 32, plus the inlet temperature at the outlet of nozzle 17, less the outlet temperature at exhaust port 33.

The speed of rotation of the turbine 11 during operation can be regulated by changing the fuel flow input into the combustion chamber 14 and 15 via orifices 18 and 19 with fuel valve 44. As the fuel is leaned, the detonations become less powerful, therefore slowing the turbine 11 and blower 48. As the fuel is enriched, the detonations become more powerful and the turbine 11 and blower 48 increases speed. The greater the range of the flammability of the fuel, the greater the range of control over the speed of the turbine 11 rotation.

Typical input requirements, at mean operating power, for the preferred embodiment of the system are as follows:

Fuel 0.3 pound propane per horsepower hour.
Air 5.3 pounds per horsepower hour.

This is about one-half the air and fuel needed per horsepower of output for Otto cycle and Diesel cycle piston engines, and about one-eighth that required for the same output by Brayton cycle turbine engines.

Operation of the Detonation cycle turbine is terminated by closing fuel regulator valve 44 and disengaging switch 46.

It is within the contemplation of the invention that a plurality of the turbines, all in the same block, or in a succession of blocks be constructed and jointly operated in the same manner to drive the same drive shaft 12.

Reiterating the cyclic operation, and the methods and apparatus utilized in the invention; the switch is engaged connecting the starter to the battery; the starter engages the flywheel and rotates the shaft, the power take-off, the air blower, and the alternator. Air is fed into the common manifold connecting the two combustion chambers. Gaseous fuel is injected into the venturis and mixed with air. The fuel-air mixture is injected into both chambers. Photolytic and radiolytic radiation produced by the plasma arcs across the high voltage electrodes in the chambers atomizes the oxidizer and produces a detonation in one of the combustion chambers. The overpressure of the first detonation, in the respective combustion chamber, momentarily shuts off the fuel and oxidizer flow at the combustion chamber input orifice and venturi tube and the fluid flow reverts to the opposing combustion chamber, via the manifold, where the second detonation occurs. The overpressure mass, compressed gases, products of the cyclic deonations, are cyclically exhausted via nozzles into elliptical bladed cavities on the peripheral surface of the turbine. After each detonation, the pressure in the respective combustion chamber and manifold drops below the air and fuel injection pressure on completion of exhausting the combusted gases via the nozzle, and a new charge of air and fuel is injected by the manifold and respective venturi tube, into the respective combustion chamber, and the detonation repeats. The impulse of the high-pressure high-velocity mass kinetically impacts the elliptical blades of the turbine forcing it to rotate. As the turbine rotates the compressed gases expand out of the cavity and across the periphery of the elliptical blades into the expansion chamber and out the exhaust pushing the turbine into faster rotation. The torque produced by the acceleration of the turbine and shaft is converted mechanically and/or electrically. Acceleration and torque are determined by various volumes of fuel-oxidizer mixes, volumes of combustion chambers and nozzles, number of combustion chambers and number and radius of turbines.

The invention may be further understood with reference to the concrete example, a prototype engine test, that is illustrated and graphically presented in FIGS. 3–7.

Figure 3:
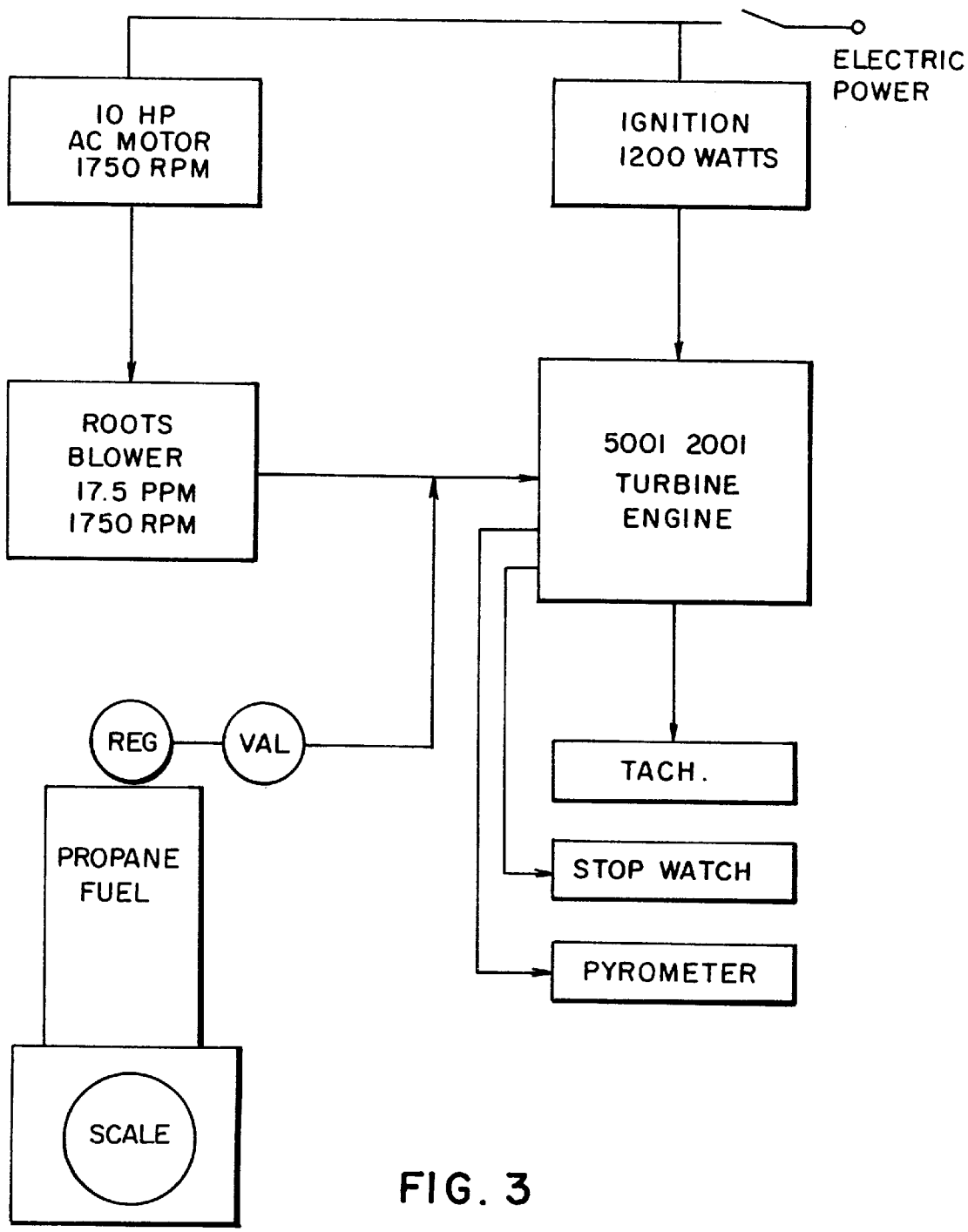
FIG. 3 is a block diagram of an acceleration testing system for a high inertia turbine engine system of the present invention utilized as a fluidic dynamometer.

In FIG. 3, there is shown a turbine engine system of FIGS. 1 and 2, incorporated in an acceleration testing system, results of the operation of which are described below in relation to the charts shown in FIGS. 4–7.

The engine and test system used in the system of FIG. 3 had the following configuration:

BLOCK: Made of machined aircraft aluminum. Measured 14"×14"×14".

TURBINE ASSEMBLY: Two 6.7" diameter turbines, 3" wide, weight 19.35 lbs., each mounted on 2"×26"-10-lb. shaft supported by ball bearings. Total weight of turbines 38.7 lbs. Total weight of turbine assembly—48.7 lbs.

COMBUSTOR ASSEMBLY: Four 140 ci combustors connected by two crossover manifolds. Each combustor was fired by a single electrode powered by the electrical device described herein. Each had an exhaust nozzle orifice measuring 563/1000", with a cross-sectional area of 0.248378 square inches, a total of 0.9935 square inches for four nozzle orifices.

ENGINE ASSEMBLY TOTAL WEIGHT: Total weight: 262 lbs.

AIR SUPPLY ASSEMBLY: A Roots blower, driven by a 10 HP electric motor turning 1760 RPM, produces 17.5 lbs. of air/min., 231 SCFM.

FUEL SUPPLY ASSEMBLY: Two 30-lb. propane tanks with pressure regulators and control valves supply fuel to each combustor via an intake port on each manifold. For safety, only two combustors were fuel by each tank by separate fuel lines. Mean combustion heat of the propane was 20,500 BTU/lb.

TEST EQUIPMENT: A standard pounds scale was used for weighing propane tanks. A Photo-Tachometer was used to measure motor and Roots blower RPM and shaft RPM of the engine. A stop watch was used for timing acceleration run time. A pyrometer was used for measuring inlet gas temperatures at nozzles and outlet temperatures at exhaust.

COMBUSTION OVERPRESSURE ACCELERATION OF TURBINE ASSEMBLY FROM 0 RPM

Atm Temperature: 88° F. Aim Pressure: 14.7 psia
Fuel tanks were weighed.
Fuel tank #1 weight: 51 lbs., 2 oz.
Fuel tank #2 weight: 51 lbs., 4 oz.
Both fuel tanks were then connected to their respective fuel lines.

The power switch was engaged, activating the air supply assembly, producing 17.5 lbs. of air/min., 231 SCFM, at a velocity of 558 fps at 1.2 Atms.

Simultaneously, the ignition switch was engaged; the fuel valves on both tanks were opened; and the stop watch was started. The engine shaft acceleration was measured by the photo-tachometer at 30, 60 and 90 second intervals. At an elapsed time of 90 seconds, the shaft RPM was recorded at 12,587 RPM. The fuel valves were closed. The ignition switch was turned off. The air supply assembly continued to operate for 3 minutes, cooling the engine. The air supply assembly was switched-off and the turbines wound down to stop.

Engine Shaft 0–8,270 RPM 0–11,237 RPM 0–12,587 RPM Acceleration

Acceleration Time 30 sec. 60 sec. 90 sec.

The fuel lines were disconnected and the fuel tanks weighed.

Fuel tank #1 weight: 50 lbs., 6 oz.
Fuel tank #2 weight: 50 lbs., 12 oz.
Total Fuel Consumed in 30 Seconds: 0.50 lbs.=0.01666 lb./sec.
Total Fuel Consumed in 103 Seconds: 1 lb., 4 oz.
Nozzle Inlet Temperatures initial 1792° F. Final 1544° F.
Exhaust Outlet Temperatures initial 360° F. Final 842° F.

MEASURED ACCELERATION TEMPERATURE DROP IN WORKING FLUID ACROSS TURBINES

Nozzle inlet Temperatures
 Initial Temperature=1792° F.
 Final Temperature=1544° F.
Exhaust Outlet Temperatures
 Initial Temperature=360° F.
 Final Temperature=842° F.
Total Temp. Drop Across Turbines—4 Nozzles to 4 Exhaust
 Initial Drop=5728° F. Final Drop=2808° F.
Average Total Temp. Drop Across Turbines—4 Nozzles to 4 Exhaust
 Average Drop=4268° F.

THERMAL—THERMOKINETIC—HORSEPOWER EQUIVALENTS TO TOTAL TEMPERATURE DROP IN WORKING FLUID ACROSS TURBINES

Thermal Equivalent (TE)
 Temp. °F.×Working Fluid lbs./sec.×Working Fluid Sp. Heat in BTU/lb/°F.
 TE=4268° F.×0.30832 lbs./sec.×0.2095 BTU/pound/°F.= 275.68 BTU/sec.
Thermokinetic Equivalent (TKE)
 BTU/sec.×lbft/BTU
 TKE=275.68 BTU/sec.×778 lbft/BTU=214,479 lbft/sec.
Horsepower Equivalent (HP)
 Thermokinetic lbft/sec.÷lbft/sec./Horsepower $$HP = \frac{214{,}479 \text{ lbft/sec.}}{550 \text{ lbft/sec.}} = 390 \text{ HP}$$

Figure 4:
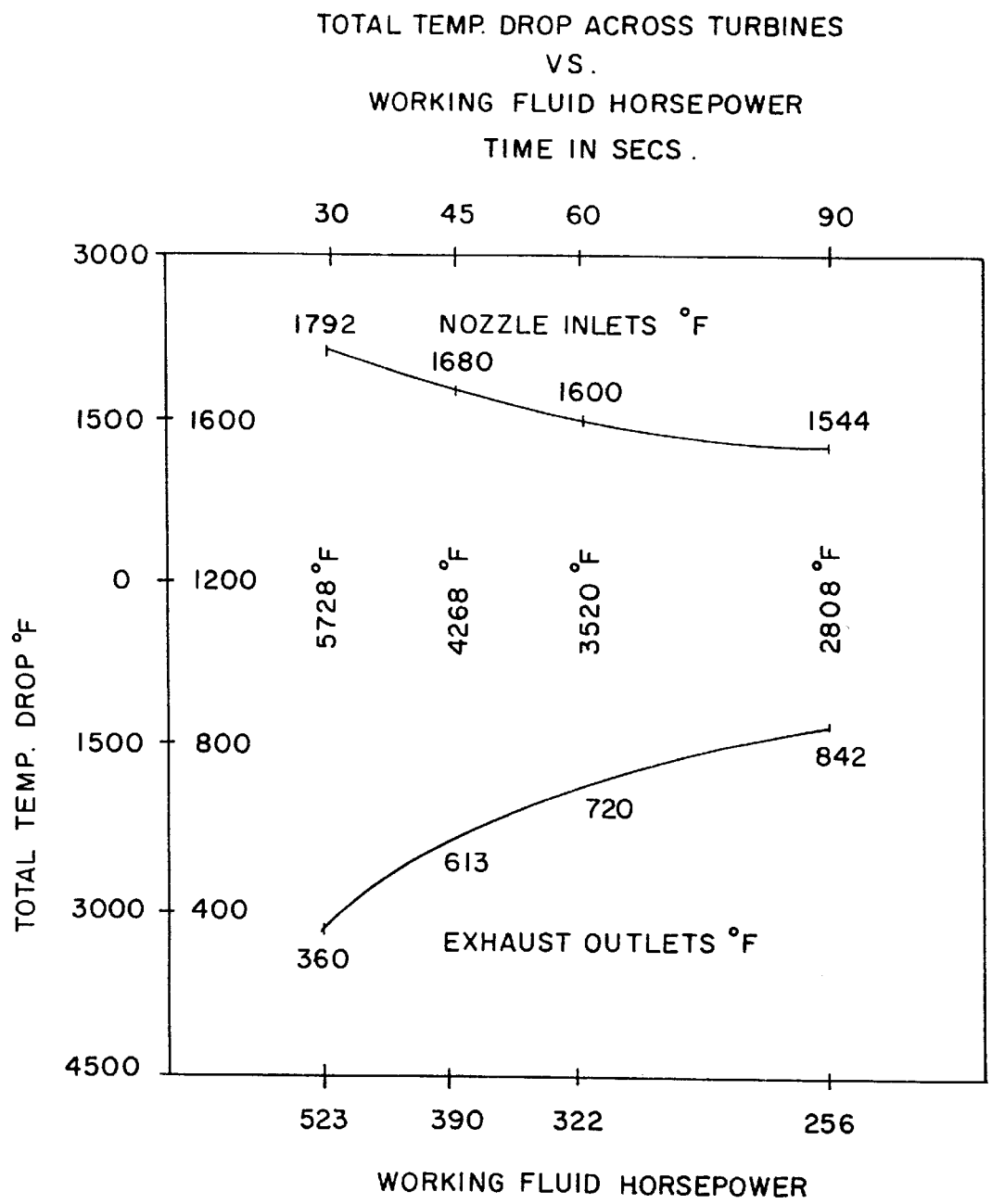
FIG. 4 is a graph of total temperature drop across turbines versus working fluid horsepower for the turbine engine system of FIG. 3.

See FIG. 4.

MEASURED ENGINE SHAFT ACCELERATION PRODUCED BY WORKING FLUID OVERPRESSURE DRIVING TURBINES

Angular Acceleration (a)
a=Angular Speed w÷Acceleration Time t
 1) w=8,270 RPM×6.283 Radians/Rev=51,960 Radians/min.
a=w/t =

$$a = \frac{w}{t} = \frac{51{,}960 \text{ Radians/min.}}{30 \text{ sec.}} = 1732 \text{ Radians/sec/sec}$$

=1732 Radians/sec/sec
 2) w=11,237 RPM×6.283 Radians/Rev=70,602 Radians/min.
a=w/t=

$$a = \frac{w}{t} = \frac{70{,}602 \text{ Radians/min.}}{60 \text{ sec.}} = 1177 \text{ Radians/sec/sec}$$

=1177 Radians/sec/sec
 3) w=12,587 RPM×6.283 Radians/Rev=79,084 Radians/min.
a=w/t $$a = \frac{w}{t} = \frac{79{,}084 \text{ Radians/min.}}{90 \text{ sec.}} = 879 \text{ Radians/sec/sec}$$

Figure 5:
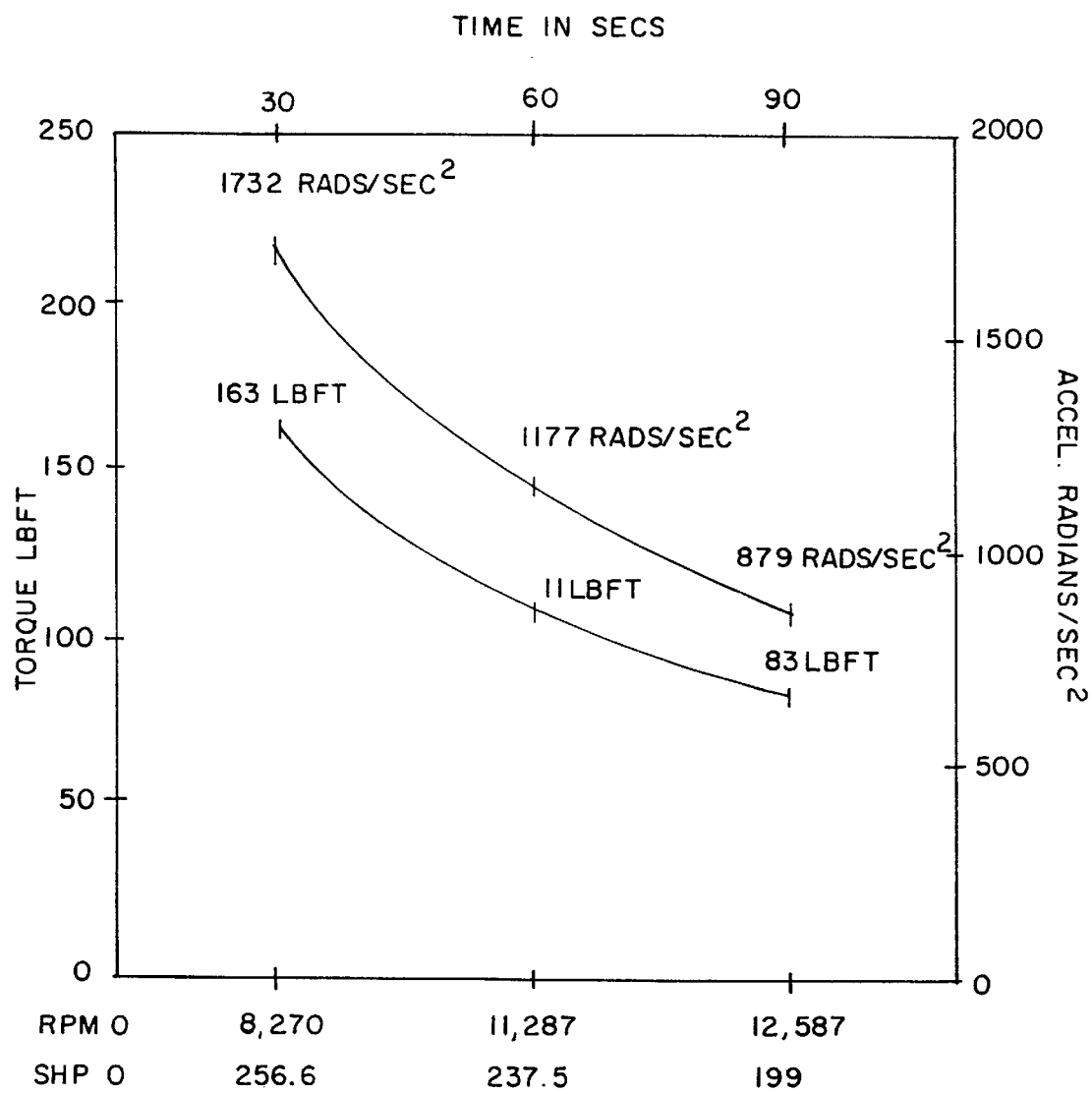
FIG. 5 is a graph of acceleration and torque versus RPM and shaft horsepower for the turbine engine system of FIG. 3.
Figure 6:
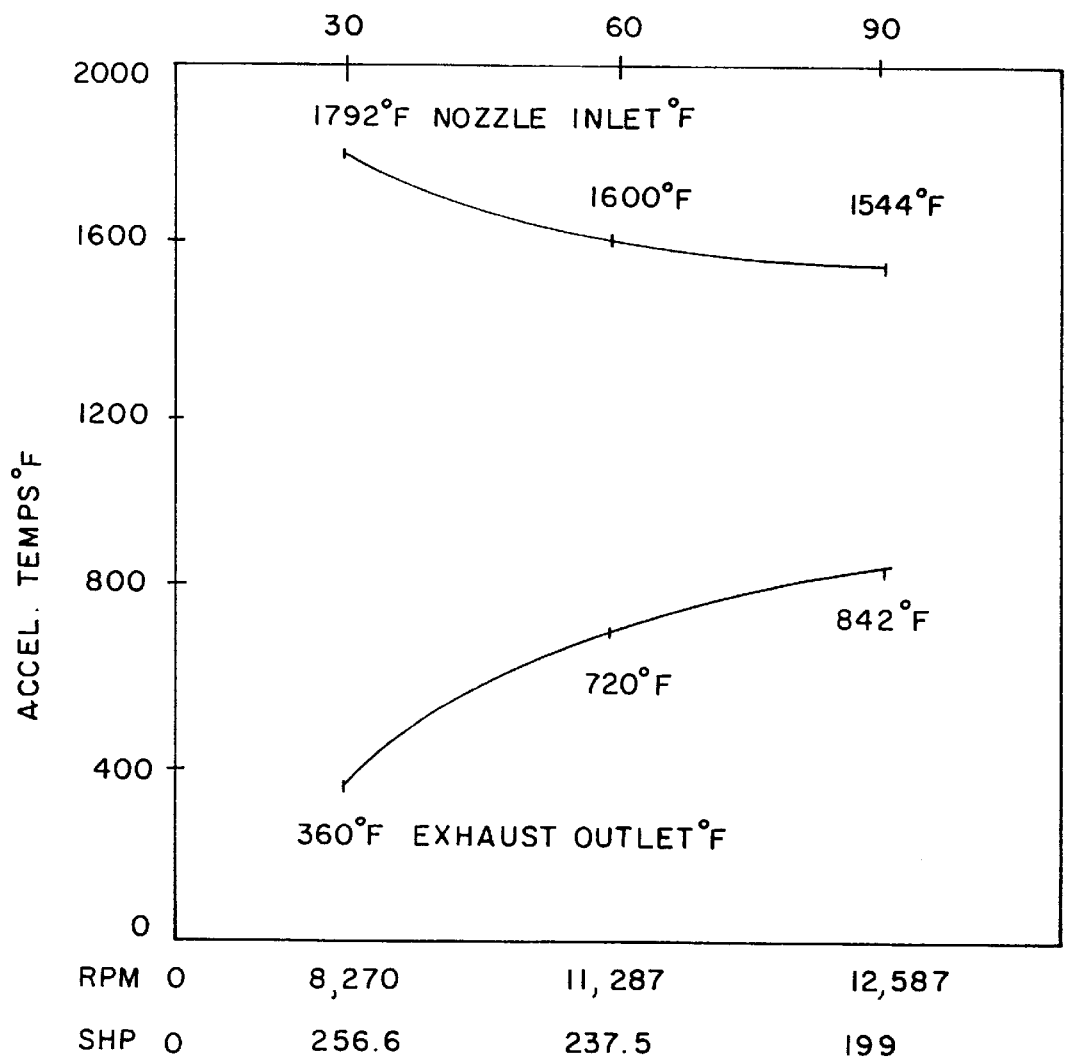
FIG. 6 is a graph of nozzle inlet and exhaust outlet acceleration gas temperatures versus RPM and shaft horsepower for the turbine engine system of FIG. 3.
Figure 7:
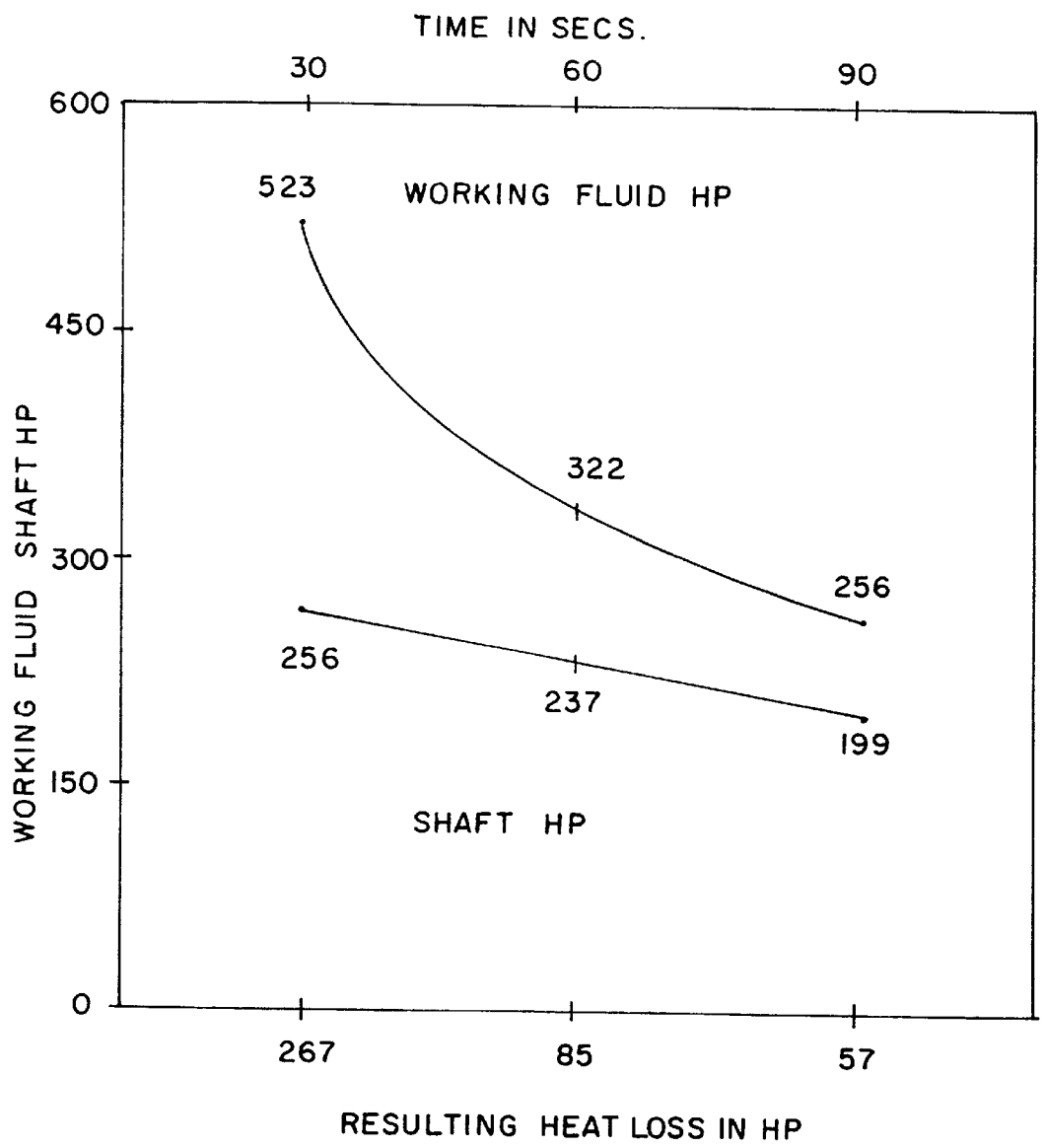
FIG. 7 is a graph of working fluid horsepower versus shaft horsepower and the resulting heat loss in horsepower across high-inertia turbines.

=879 Radians/sec/sec
See FIG. 5.

ACCELERATION TORQUE AND SHAFT HORSEPOWER PRODUCED BY WORKING FLUID OVERPRESSURE DRIVING TURBINES:

TORQUE (T)
 T=Turbine mass (m)×Turbine Radius Squared ($r^2$)×Shaft Accel (a)
 1) T=$mr^2a$=1.209 lbsec$^2$/ft×0.279 ft$^2$/Rad×1732 Rads/sec/sec
 T=163 lbft
 2) T=$mr^2a$=1.209 lbsec$^2$/ft×0.279 ft$^2$/Rad'1177 Rads/sec/sec
 T=111 lbft
 3) T=$mr^2a$=1.209 lbsec$^{2/ft}$×0.279 ft$^2$/Rad×879 Rads/sec/sec
 T=83 lbft

SHAFT HORSEPOWER (HP)

HP = Torque × Shaft RPM ÷ 5252 lbft $$1) HP = \frac{163 \text{ lbft} \times 8{,}270 \text{ RPM}}{5252 \text{ lbft}} = 256.6$$

$$2) HP = \frac{111 \text{ lbft} \times 11{,}237 \text{ RPM}}{5252 \text{ lbft}} = 237.5$$

$$3) HP = \frac{83 \text{ lbft} \times 12{,}587 \text{ RPM}}{5252 \text{ lbft}} = 199$$

What is claimed is:
1. A detonation cycle turbine engine system, comprising:
at least one housing having wall surfaces defining an internal cavity;
a shaft extending into and from each said housing;
a turbine rotor within said housing cavity and fixed on said shaft, said turbine rotor being supported for rotation within the cavity about a longitudinal axis of said shaft, said turbine rotor having provided on a radially outer periphery thereof a plurality of turbine blades arranged in a series extending circumferentially about said axis and forming, in combination with said cavity-defining wall surfaces, a plurality of impulse cavities in each housing;

at least one combustion chamber, each combustion chamber having a valveless intake end and a valveless exhaust, said exhaust communicating with said internal cavity and at least one impulse cavity;

a source of fuel and a source of oxidizer;

a valveless manifold means with a venturi throat construction having means for combining fuel from said fuel source and oxidizer from said oxidizer source to provide a fuel-oxidizer mixture in a ratio capable of detonating explosively in a selected combustion chamber in less than 5 milliseconds, said means including means for providing the mixture with a low pressure, above ambient, intermittent delivery and means for cyclically supplying said fuel-oxidizer mixture, under pressure, to each said combustion chamber;

an igniter in each said combustion chamber operable at a rate greater than ten detonations per second in said combustion chamber to produce intermittent overpressures in said combustion chambers by detonating the cyclically supplied fuel and oxidizer mixture;

a conduit means communicating with said combustion chamber exhaust and said impulse cavity and arranged to momentarily direct said overpressure in said combustion chamber into angularly successive ones of said impulse cavities, thereby applying pressure on said turbine blades for rotating the turbine rotor and thereby rotating said shaft; and for each said combustion chamber, a corresponding expansion chamber opening through said cavity-defining wall surfaces of said housing, rotationally downstream of the respective combustion chamber and the corresponding impulse cavity for expanding overpressure combustion gases directionally with the rotation direction of the turbine rotor across an outer periphery of said turbine blades, each expansion chamber including an exhaust port for exhausting spent combustion gas from said housing.

2. The turbine engine system of claim 1, wherein said manifold means includes a low-pressure blower for compressing said oxidizer and then combining fuel with compressed oxidizer in each said combustion chamber.

3. The turbine engine system of claim 1, wherein there are only two of said combustion chambers for each said housing; and said directional nozzles thereof intersect said internal cavity of said housing substantially 180 degrees apart with reference to the axis of rotation.

4. The turbine engine system of claim 3, wherein said exhaust ports emerge radially outward from said housing through the outer wall thereof.

5. The turbine engine system of claim 4, wherein said exhaust ports emerge through said outer wall substantially 180 degrees apart with reference to said axis.

6. The turbine engine system of claim 1, wherein each of said turbine blades has a trailing face which is concavely curved as seen in transverse cross section.

7. The turbine engine system of claim 6, wherein each said trailing face is prolately elliptically curved as seen in transverse cross section.

8. The turbine engine system of claim 1, wherein the igniter comprises at least one electrode arranged to provide a high voltage—high frequency alternating current photolytic arc in its respective combustion chamber.

\* \* \* \* \*